Nov. 19, 1929.

R. B. PAULL

ATOMIZING DEVICE

Re. 17,495

Original Filed Feb. 7, 1927

INVENTOR
Roy B. Paull
BY John W. Maupin
ATTORNEY

Reissued Nov. 19, 1929 Re. 17,495

UNITED STATES PATENT OFFICE

ROY B. PAULL, OF SEATTLE, WASHINGTON

ATOMIZING DEVICE

Original No. 1,685,293, dated September 25, 1928, Serial No. 166,397, filed February 7, 1927. Application for reissue filed March 9, 1929. Serial No. 345,832.

My invention relates to atomizing devices and certain objects of the invention are to provide an atomizer comprising a mixing chamber that is formed by the union of two members each having an inwardly extended nozzle. Further objects are to arrange the ends of said nozzles in an almost abutting position and to provide one of said ends with a solid head whereby the liquid from the other nozzle, upon coming in contact with the head, is both thinned and somewhat diverted in its direction of flow. Other objects are to provide means for diverting the liquid from the solid head in the form of a thin flared jet that completely surrounds the other nozzle through which the liquid enters. Still further objects are to provide a mixing chamber that is formed by two substantially cone shaped hollow members that are detachably secured together at their base portions and whereby the jet of liquid is projected into the vertex end portion of the cone which carries the entry nozzle. Another object is to provide means for the entry of a heating and thinning medium such as steam or hot air at this vertex end so that it will strike the entry nozzle at a point furthest removed from its outlet end and will therefore have a maximum effect in thinning the liquid within said nozzle throughout its expansive movement within the chamber. And still another object is to provide for the entry of a thinning medium at this vertex end for the purpose of striking the flared jet of liquid at a point furthest removed from its source whereby it will complete the atomizing process in its expansive movement from the contracted end to the base of this cone chamber.

In atomizers it is assumed that the liquid undergoing atomization is introduced into the device under pressure. My device is particularly adapted for use in combination with oil burners and in its practical application for such use I have found that it gives better results by introducing the liquid under substantially ten percent greater pressure than the pressure of the steam or other vaporizing agent. I thus project the liquid jet directly into the steam at a considerably higher velocity than the velocity of the steam which I believe greatly increases the efficiency of my device in its use for this particular purpose.

With the above and other objects in view which will appear as the description proceeds, the invention consists of the novel construction, adaptation, combination and arrangement of parts hereinafter described and claimed. These objects are accomplished by the devices illustrated in the accompanying drawings; wherein:—

Figure 1:
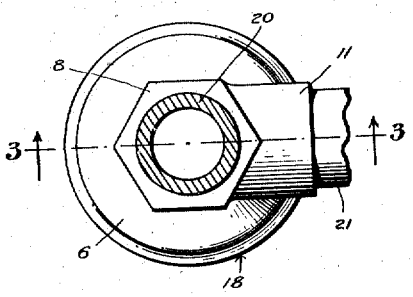
Figure 1 is a top plan view of the device.
Figure 2:
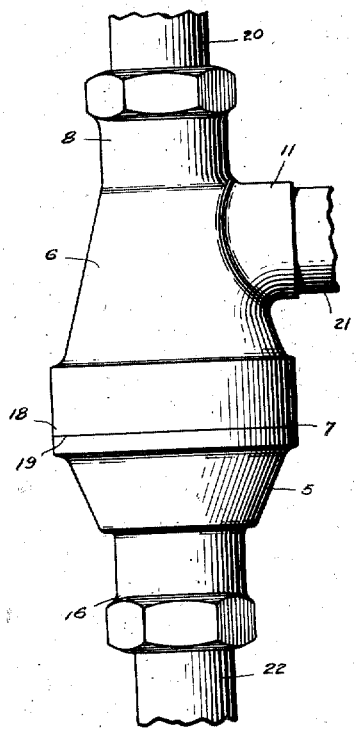
Fig. 2 is a view in side elevation.
Figure 3:
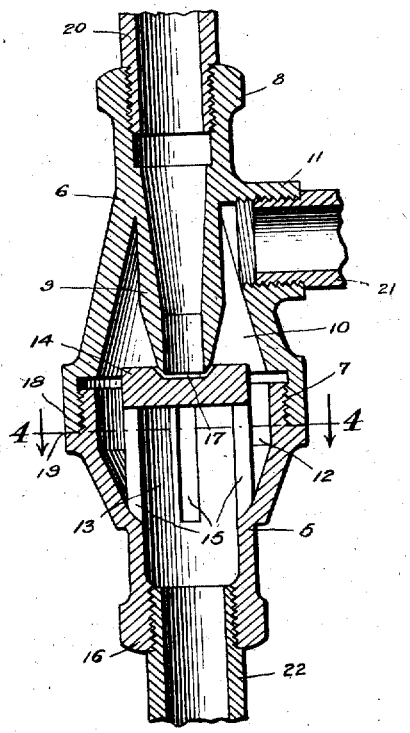
Fig. 3 is a view in central vertical section taken on a broken line 3, 3 of Fig. 1.
Figure 4:
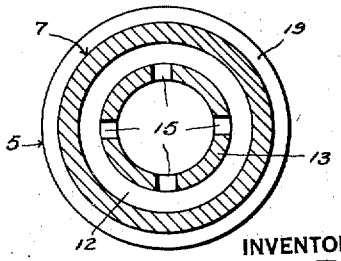
Fig. 4 is a view in horizontal section taken on a broken line 4, 4 of Fig. 3.

Referring to the drawings throughout which like reference numerals designate like parts, the numerals 5 and 6 indicate respectively the male and female members of the device that are threadedly connected at 7. It will however be understood that either of said members may be the male or the female member, this being a matter of structural preference.

The liquid intake end 8 of said female member 6 has an integral supply nozzle 9 extending substantially the full length of a conical chamber 10 formed by the tapered walls of said female member. Another intake 11, disposed at the reduced end of said chamber and approximately at a point half the length of said female member, provides means for the entry of steam or hot air as will be more fully described hereinafter. It will here be noted that this steam or hot air entry is positioned at the vertex end portion of this conical chamber where its convergent walls join said supply nozzle.

The discharge or male member 5 is provided with a chamber 12, and an integral discharge nozzle 13 extending slightly more than the full length of said chamber terminates in a relatively thick head 14. Said discharge nozzle is provided with a plurality of spaced side slots 15 for the passage of the mixture on its way out of the discharge end 16 of said male member. It will here be noted that said male member and its chamber are prefera-

BEST AVAILABLE COPY bly, although not necessarily, made substantially in the shape of a cone also.

The solid head 14 of the discharge member 13 may be centrally provided with a shallow recess 17 and when the flange end portion 18 of the female member 6 is in abutment with an annular shoulder 19 the device is in its normally operative position. In this position the complementary chambers 10 and 12 cooperatively form a mixing chamber, and the tapered end of the nozzle 9, in juxtaposition with the recess 17, will leave a slight space between said nozzle end and recess for the passage of liquid or other fuel. This recess slants inwardly to conform with the tapered end of said supply nozzle for the purpose of directing the flow of the liquid upwardly and outwardly into the vertex end portion of the conical chamber 10.

In the operation of the device the liquid enters the intake end 8 through a supply pipe 20 and passes into the nozzle 9. Owing to the viscosity of some liquids and to the restricted passage between the end of said nozzle and the recess 17, the liquid will not readily pass into the chamber 10. A jet of steam or hot air is now admitted through the intake 11 from a pipe 21.

When steam is used as a medium for operating the device and crude oil is used as the liquid its density will be somewhat reduced by the steam striking the outer walls of the nozzle 9 and same will pass more readily into the chamber 10. Here the liquid will be further atomized by the steam and projected through the chamber 12, slots 15, nozzle 13 and through a delivery pipe 22 to the desired point of ignition in a finely divided or semi-gaseous state.

The advantage of locating the entry for steam at the vertex portion of the chamber 10 is that it will have a maximum effect in warming the entry nozzle 9 in its expansive movement to the base of said conical chamber. In its passage through the restricted opening between the end of this nozzle and the recess 17 in the head 14 the oil will be substantially reversed in its direction of flow, somewhat atomized, converted into a thin flared jet surrounding the entry nozzle and projected into the opposing flow of steam within the convergent end portion of this chamber at a considerably increased velocity. And here the oil, which has already been reduced to a somewhat atomized state, will now be completely atomized by the steam in its expansive movement from the vertex to the base of said cone chamber. In this movement toward the discharge portion of the device the resultant mixture will follow the outer walls of the chamber and will therefore avoid the denser and oppositely moving oil adjacent the center.

It will now be apparent that I have embodied all the essential features of an efficient and durable atomizing device in a very simple form comprising only two units and which is comparatively low in its cost of production. My atomizer is direct acting throughout, does not form carbon, and may be readily disconnected and cleaned, although I have found that it requires almost no attention after it is installed.

While I have shown and described the preferred embodiment of my invention, it will be understood that I do not wish to limit myself to the exact structure herein shown to such an extent as would permit others to circumvent my device by making slight alterations therein. The two members comprising the mixing chamber might be brazed or welded together to form a single unit and other minor changes might be made in its form and structural details although I do not believe that its efficiency would be increased thereby. Having thus described my invention, what I claim and desire to secure by Letters Patent of the United States is:—

1. An atomizing device comprising an entry member having a conical chamber, an entry nozzle extended inwardly from the vertex end of said chamber, a discharge member having a conical chamber, a discharge nozzle extended inwardly from the vertex end of the conical discharge chamber, the ends of the entry and discharge nozzles disposed in juxtaposition to form a restricted passage, and means for the entry of a reducing medium disposed at the vertex end of the conical entry chamber.

2. An atomizing device comprising two conically hollowed members threadedly connected at their base portions to form a mixing chamber, a nozzle extended inwardly from the vertex of each member having their ends juxtaposed, a head for the end of one of said nozzles, the end of the other nozzle arranged to cooperatively form a restricted passage with the head and means for the entry of a reducing medium disposed at the vertex end of one of said conical members whereby said medium is projected directly against the nozzle thereof.

3. An atomizing device comprising two hollow members each of divergent shape and secured together at their larger ends and together forming a mixing chamber, one of said members having a supply nozzle extending centrally through its interior from its smaller end and the other member having a discharge nozzle extending centrally therethrough, said last named nozzle having a solid head and provided with openings in its side wall, said two members being arranged relatively to each other to provide a narrow space between the open end of said first named nozzle and the solid head of the other nozzle, and means for admitting a heating and reducing fluid to that portion of the chamber in which is located the supply nozzle.

4. An atomizing device comprising two hollow members each approximately of conical shape and secured together at their larger ends and together forming a mixing chamber, one of said members having a supply nozzle extending centrally through its interior from its smaller end and the other member having a discharge nozzle extending centrally through it, said last named nozzle having openings in its side wall to put its interior into communication with said mixing chamber and having its inner end closed by a solid head in the outer surface of which is a recess that lies opposite and in close proximity to the open inner end of said supply nozzle whereby liquid passing out of said supply nozzle under pressure will be deflected into that portion of the mixing chamber through which the supply nozzle projects, and means for admitting a heating and reducing fluid to said last mentioned portion of the mixing chamber.

5. An atomizing device comprising an entry member having a conical chamber, an entry nozzle extending centrally and inwardly from the vertex end portion of said chamber, a hollow discharge member, a discharge nozzle extending centrally through said hollow member, said discharge nozzle having slots in its sides and a solid head for its inner end, said entry and discharge members arranged to conjointly form a mixing chamber, the solid head having a convergent recess in its outer surface, the open end of the entry nozzle extending into said recess leaving a restricted passage between the head and nozzle whereby liquid under pressure from the entry nozzle will be deflected back in the form of a flared jet surrounding said entry nozzle, and means for admitting a heating and reducing fluid at the vertex end portion of the conical entry chamber.

6. An atomizing device comprising a female member having a conical recess therein, a supply nozzle for said member projecting into said recess, a male member having a conical recess therein, a discharge nozzle for the male member projecting into its recess and having spaced side slots, the recesses in the male and female members adapted to conjointly form a mixing chamber, a solid head for the discharge nozzle having a recess therein, the end of the supply nozzle projecting into said recess in slight spaced relation therewith, and means for entry of a reducing medium for the mixing chamber.

In witness whereof, I hereunto subscribe my name this 6th day of March, A. D. 1929.

ROY B. PAULL.